United States Patent
Schwartz et al.

(10) Patent No.: US 8,572,095 B2
(45) Date of Patent: Oct. 29, 2013

(54) ADAPTIVE OBJECT IDENTIFICATION

(75) Inventors: Dror Schwartz, Holon (IL); Moshe Eran Kraus, Mazkeret Batya (IL); Sagi Monza, Rishon-Lezion (IL); Svetlana Aronov, Rehovot (IL); Michal Barak, Kiryat Ono (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 376 days.

(21) Appl. No.: 12/907,154

(22) Filed: Oct. 19, 2010

(65) Prior Publication Data
US 2012/0096010 A1   Apr. 19, 2012

(51) Int. Cl.
*G06F 7/00*       (2006.01)
*G06F 17/30*      (2006.01)

(52) U.S. Cl.
USPC .......................................... 707/748; 707/803

(58) Field of Classification Search
USPC .................... 707/748, 803; 705/26
See application file for complete search history.

(56) References Cited

U.S. PATENT DOCUMENTS

| | | | | |
|---|---|---|---|---|
| 6,418,451 | B1 * | 7/2002 | Maimone | 707/803 |
| 6,721,740 | B1 * | 4/2004 | Skinner et al. | 707/10 |
| 7,783,528 | B2 * | 8/2010 | Musgrove et al. | 705/26.1 |

OTHER PUBLICATIONS

Selenium, Selenium Documentation—Release 1.0, dated Sep. 27, 2010 (166 pages).
Nitsan Amichai et al., International Application No. PCT/US09/65590 entitled "System and Method for Object Identification in a User Interface" filed Nov. 23, 2009 (30 pages).
Dror Schwartz et al., U.S. Appl. No. 12/814,345 entitled "Scripting Application with Role Identification" filed Jun. 11, 2010 (19 pages).
Dror Schwartz et al., U.S. Appl. No. 12/794,621 entitled "Object Identification Elector" filed Jun. 4, 2010 (22 pages).
Dror Schwartz et al., U.S. Appl. No. 12/910,025 entitled "Relation-Based Identification of Automation Objects" filed Oct. 22, 2010 (30 pages).

* cited by examiner

*Primary Examiner* — Apu Mofiz
*Assistant Examiner* — Chelcie Daye

(57) ABSTRACT

A adaptive object identification mechanism provides an object description of an object of an application that is executed by a processor, where the object description is based on attributes associated with the object. When an operation on the object is detected, the attributes of the object are sampled at the time of the operation and compared with the object description to assess whether the attributes have changed. The object description is then adjusted based on the assessment.

17 Claims, 2 Drawing Sheets

ADAPTIVE OBJECT IDENTIFICATION

BACKGROUND

Modern web applications employ web pages and other documents that include objects represented by a document object model (DOM) or other similar structure that can be acted on or manipulated. These objects often have attributes that can change. The attributes include internal attributes, such as identifiers or object names, and external attributes, such as text, color, size, borders, display location, etc. To manipulate or act upon an object, a script or program must first identify the object to be manipulated. Object identification typically involves creating a description of the object based on attributes of the object that can be used to locate the object at a later time.

BRIEF DESCRIPTION OF THE DRAWINGS

Some embodiments are described with respect to the following figures.

DETAILED DESCRIPTION

Figure 1:
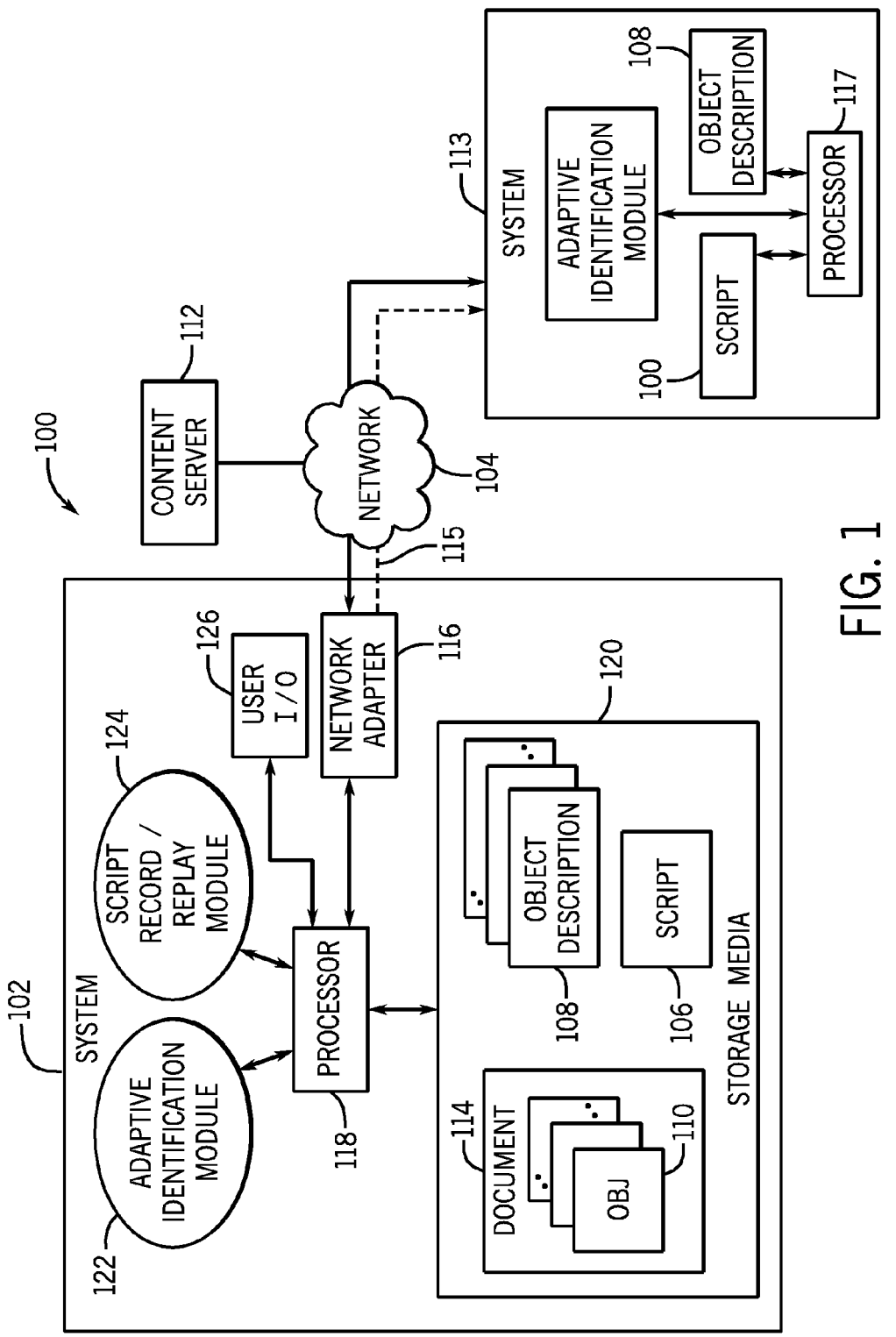
FIG. 1 is a block diagram of system in which an exemplary adaptive object identification mechanism may be implemented in accordance with various embodiments.

Object identification techniques typically involve generating an object description based on an attribute or combination of attributes that are useful for uniquely identifying that object. In web applications, however, traditional object-identifying attributes, such as an identifier or object name, may change over time or even be assigned to a different object, thus presenting difficulties in using such attributes to later locate the object. Likewise, external attributes of the object, such as color, size, text, borders, and the object's location on a display, also may change, thus rendering such attributes unsuitable for definitively identifying the object.

Identification of objects in web applications can be useful to replicate the operations previously performed on an object. For instance, automated testing tools (e.g., which may be used to simulate loads on a server, perform function testing to identify faults in the system, test security features of the system) typically replay scripts that have been created based on previous observations of a user's interaction with the web application. Such tools generally operate by monitoring a user's interactions with objects in a web application and generating a script of those interactions (i.e., script recording time). Then, at a later time, multiple instances of the script may be replayed (or executed) for testing purposes (i.e., script replay time). These scripts may not be recorded and reliably replayed if the objects with which the user interacts cannot be identified in a manner that permits an automated tool to later identify and/or locate the object.

Object identification techniques that have been employed by such tools typically create a description of the object based on a single observation of the object. Such techniques generally work well for objects with static attributes. However, when objects change, separating persistent attributes of the object (which can be used to readily identify the object) from dynamic attributes is practically impossible based on a single observation. Thus, single-observation techniques inherently limit automatic identification to relatively static objects or require manual user intervention to update the object description. In most cases, manual intervention not only is inefficient, but it also may not be particularly accurate since it typically involves subsequent observations of the object at times that are blindly selected by the user. These blindly selected times may not necessarily coincide with a change in a dynamic attribute. Consequently, the risk exists that a dynamic attribute may be mistaken for a static attribute. If the dynamic attribute then is used to later identify/locate the object during replay of the script, a mismatch or a complete failure to match may occur.

Accordingly, embodiments described herein provide mechanisms and techniques for automatically and adaptively generating descriptions of objects that have dynamic attributes. These adaptive identification techniques employ multiple sampling of the attributes of the object and, based on the multiple observations, automatically adjust a stored description that has been created for the object. The multiple samples may be taken at various points in the lifetime of the object that have been deemed to be "interesting." In exemplary implementations, "interesting" points correspond to events that are likely to provoke or correspond to a change in the values of the attributes of the object. Observation of the object at these interesting points in its lifetime can enable the adaptive description mechanism to identify those attributes that may be most useful for creating an object description having a high likelihood of enabling identification/location of the object at a later time. In general, these attributes are the attributes of the object that do not change. Thus, for instance, based on the observations, the adaptive object description technique can distinguish static attributes from dynamic attributes, discard or compensate for the dynamic attributes, and place more emphasis on the static characteristics to create an object description.

In many instances, definitive distinction between static and dynamic attributes may be difficult. Thus, in some embodiments, the adaptive description mechanism may derive importance scores (or other ratings) for each attribute, where each score is indicative of a degree of importance the attribute has relative to identification of the object. In general, a persistent attribute has the highest importance, while a dynamic attribute has the lowest importance. Thus, with each observation of the object, the score may be re-evaluated and/or adjusted to reflect a new assessment of the attribute's usefulness to objection identification.

For instance, if further observations reveal that the value for a particular attribute changes, then the score for that attribute may be lowered to reflect a decrease in the attribute's importance for identification of that object. Conversely, if the value of the attribute does not change, then the score may be raised. In some embodiments, if the score for a particular attribute exceeds a predetermined threshold or reaches a maximum level, then further samples of that attribute need not be taken. Similarly, if the score for a particular attribute falls below a predetermined threshold or reaches a minimum level, then the attribute may be disregarded or discarded altogether from the object description. In yet other embodiments, the importance scores of multiple attributes of an object may be combined. Once the combined score exceeds a predetermined threshold, then further sampling of the object may be stopped. It should be understood that the fact that the value of an attribute has changed is provided as only one example of an indicator that may be used to evaluate an attribute's importance to object identification. Other behaviors also may be used in the evaluation, such as the fact that a value did not change.

In some embodiments, particularly in instances where ambiguity is present as to description created for the object, the stored object description (including the importance scores) that was created during the script record time may be further refined based on subsequent observations of the object during script replay time. The ability to perform such refinement may be particularly useful in testing scenarios in which the script is replayed multiple times. For instances, successful object identifications during replay (i.e., a match) can provide a higher degree of confidence that the attributes used in the object description are, in fact, important/useful for identification of the object.

FIG. 1 illustrates an example of an arrangement 100 in which adaptive object identification may be implemented. Referring to FIG. 1, as a non-limiting example, the mechanisms and techniques that are disclosed herein may be implemented in an arrangement 100 that includes a system 102 that may include one or multiple physical machines 102. In this context, a "physical machine" indicates that the machine is an actual machine made up of executable program instructions and hardware. Examples of physical machines include computers (e.g., desktop computers, notebook computers, application servers, web servers, etc.), and other types of machines, such as personal digital assistants, electronic appliances, and so forth.

As shown in FIG. 1, the system 102 may be connected to a network 104. Examples of the network 104 include a local area network (LAN), a wide area network (WAN), the Internet, or any other type of communications link, and combinations thereof. The network 104 may also include system buses or other fast interconnects.

In accordance with a specific example described herein, the system 102 contains machine executable program instructions and hardware that executes these instructions for the purpose of generating a script 106 based on observations of interactions with a web application that may be replayed at a later time (e.g., during script replay). The instructions also are executed for the purpose of creating adaptive object descriptions 108 that may be employed by the script 106 to identify/locate objects 110 associated with the web application. Towards that end, the system 102 may be coupled to another system 112, such as a content server, that may provide content in the form of web pages and other documents 114 to the machine 102 via the network 104.

System 102 may include a network adapter 116 that is coupled to one or multiple processors 118 to communicate with the system 112 via the network 104 and to acquire, for example, content 114 (e.g., web pages, applications, images, audio, video, etc.) from the remote system 112. Although system 112 is referred to as being remote from the system 102, it should be understood that system 112 is not restricted to any particular location or proximity relative to the system 102.

System 102 also may include user I/O devices 126 coupled to the processor 118 that may include various devices employed by a user. Exemplary I/O devices 126 may include video display devices and audio devices for providing output to the user that are coupled to the processor 118 through appropriate controllers or interfaces (not shown). Other exemplary I/O devices 126 include keyboards, touchscreens, pointing devices, etc., for providing user input to the processor 118.

System 102 includes computer-readable storage media 120 for storing various programs, data, etc. In the example shown, the storage media 120 may include content or documents 114, such as web pages, applications, images, etc., which include one or more objects 110 that may be acted on or manipulated during interaction with the document 114. Documents 114 also may include executable programming. Objects 110 may include any of a variety of structures that include modifiable data and/or programming that operate on the data. The data may describe, for example, a displayable element of the web page 114 (e.g., color, size, border, text, display location, etc.) wherein the displayable element is modifiable or capable of performing an operation in accordance with user input. Because the data associated with an object 110 may be modified each time the object 110 is invoked, definitive identification of the object 110 so that it can be located and acted on at a later time can be difficult.

Thus, embodiments of the system 102 employ a sampling technique whereby multiple observations are made of the object 110 over the course of its lifetime. In some embodiments, the observations may be made only during script record time. In other embodiments, additional observations may be made during script replay time so that the descriptions 108 created for the objects 110 may be refined as more information is collected and object matching results are obtained. As a result, improved performance in the ability to locate objects 110 during replay may be achieved. The sampling of the object 110 and the creation of descriptions 108 that are continuously adapted based on the sampling may be implemented by executing (by the processor 118) instructions included in an adaptive object identification module 122. Further details of the object sampling/adaptive description technique implemented using the instructions and hardware of the module 122 are provided below.

In the exemplary arrangement 100 shown in FIG. 1, the system 102 further includes a script recorder/replay module 124. The script recorder/replay module 124 can include hardware and instructions that, when executed by the processor 118, monitor user and other system 100 operations affecting the document 114 and objects 110, and record those operations to generate the script 106. The script recorder/player module 124 can also execute the script 106 at a later time to replicate the operations previously performed.

At script record time, as the script recorder/player module 124 executes to monitor system 100 operations affecting the document 114, the adaptive object description module 122 identifies operations that act on the objects 110. Operations may include user actions on the object 110 (e.g., a mouse over, a mouse click or other selection of the object, movement of a slider bar, etc.); user actions on an object 110 that affect another object 110 (e.g., a selection of a list item which changes a listbox value); a detectable change of an attribute of the object 110 (e.g., color, size, location, etc.); and so forth. When an operation acting on an object 110 is identified by the adaptive object identification module 122, the object 110 is sampled and the attributes of the object 110 at the time of the sample are used to create an initial description 108 of the object. This initial description 108 is stored (e.g., in storage media 120) so that it can be updated or adapted as additional samples of the object 110 are acquired by the adaptive identification module 122.

In some embodiments, the object 110 may be sampled at predefined intervals and the description 108 modified accordingly. However, sampling that is performed only at certain time intervals may not adequately identify an attribute as being dynamic. Mischaracterization of the nature of the properties of an object 110 can be problematic when later attempting to identify an object 110 based on a description 108 that includes an attribute that, in fact, has changed.

Accordingly, embodiments of the system 102 trigger sampling on interesting events that occur during the lifetime of the object 110. These interesting events generally include those events that are likely to correspond to a change in the dynamic attributes of an object, such as selection of an object, a mouse over an object, selection of a semantically related object that could affect the object of interest (e.g., selection of list item which changes a list box value; selection of a button related to the object, dragging a related object, entering values or text in boxes, manipulating a slider bar, etc.), a visually detectable change in the attributes of the object (e.g., color, size, display location, etc.). Some embodiments may also sample the object 110 during replay. In such embodiments, a successful identification of an object 110 during replay (i.e., a match) could be the interesting event that triggers the sampling, particularly where the identification of the object 110 involved a degree of ambiguity.

Regardless of when the samples of the object 110 are taken, after each sample, the newly acquired attribute values are compared to the stored description 108 that has been created for the object 110. If the new values reveal that a change has occurred, then the description 108 can be adapted. For instance, adaptation of the description 108 may include adjusting importance scores (or other ratings) that the module 122 has generated for each attribute included in the description 108. In some instances, the newly acquired information may indicate that an attribute can be discarded altogether from the object description 108. For example, if the value of the attribute has changed fewer than a predetermined number of times or if a change has occurred but the amount of change is within a predetermined tolerance window, then the dynamic aspect of the attribute may be compensated for by adjusting (e.g., lowering) the importance score accordingly. If the value has changed more than a predetermined number of times or by more than a predetermined amount, for example, then the attribute may be discarded from the object description 108 altogether (or assigned a score that indicates that the attribute should be disregarded).

To illustrate, assume the following samples have been taken of the address associated with a link object 110:

Sample 1: href:="http://www.somehost.com/some-text"

Sample 2: href:="http://www.somehost.com/different-text"

Sample 3: href:="http://www.somehost.com/yet-a-different-text".

After the second sample, the object description 108 may be adapted by increasing the score for the "host" and protocol attributes and decreasing the score for the "path" attribute of the link object 110. After the third sample, a conclusion may be made that the "host" and protocol attributes are static (and thus may be assigned the highest score), while the "path" attribute is dynamic and should be discarded (or assigned the lowest score and disregarded) from the description 108 for the link object 110.

Observed changes in the values of the attributes associated with an object 110 are not the only indicators that may be used to assess the usefulness of particular attributes and, thus, to adapt/update the description 108 created for the object 110. For instance, in some embodiments, the fact that a value of a particular attribute has not changed at the specific sampling time may also be significant. In such embodiments, the fact that a value did not change can be used to adjust (raise) the relative importance of that attribute in the identification mechanism used to create the description 108 for the object 110.

In addition, semantic data associated with an object 110 can be used to further calibrate the relative importance of a property. For instance, the text associated with a button object 110 is less likely to change than the text associated with an input field object. Because the description of the object 110 is created dynamically, the semantic data may be acquired during script record time by, for instance, observing a user's interaction with the object 110 and inferring from that interaction whether the semantic data associated with the object 110 is static or dynamic. As an example, a user's actions may indicate that a manipulated object 110 is a button object as opposed to an input field object 110. In such a case, the semantic data associated with the button object 110 may be accorded a higher importance score (since it will most likely not change) than a score that would be assigned to semantic data associated with an input field object 110.

An exemplary object identification/location mechanism that may be used in conjunction with the adaptive description techniques described herein employs "electors" to provide an appraisal (e.g., a rating or valuation) of objects 110 to determine which of the objects 110 is likely to correspond to an object 110 that was previously manipulated. The electors may be configured to identify an object 110 based on the various object attributes that are used to create the description 108 for the object 110, such as a tag name assigned to an object, the location of an object in a document object model (DOM), the display location of an object, display attributes of the object (e.g., color, size, etc.), the relationship of an object to another object that may be easier to locate, etc. The foregoing attributes are provided as examples only and other attributes may also be used to facilitate identification of an object 110. Yet further, any one attribute or any combination of attributes may be used to generate the description for and/or identify an object 110.

In exemplary implementations, the electors provide an appraised value or score that is used to determine whether a given object 110 corresponds to a previously manipulated object 110. When multiple electors are used to identify an object 110, then the appraised score may be a combination of the individual appraisals generated by each elector. Thus, for example, a given object 110 may be deemed to correspond to a previously manipulated object 110 if the combined appraisal score for the given object 110 exceeds a predetermined threshold value.

During record time, the adaptive identification module 122 identifies operations that act on the objects 110. When an operation is identified, the electors are invoked to determine which elector is applicable to identifying the object 110. For example, some electors may be applicable to some object 110 types (e.g., buttons) but not to other object 110 types (e.g., links). Each applicable elector collects information required to identify the object 110 and provides an appraisal (e.g., a vote or score) as to the object's identity. In some embodiments, the appraisal is a value ranging from −1 to +1 where −1 indicates a total mismatch, +1 indicates a total match, and 0 indicates no appraisal. Appraisals may be weighted in accordance with the perceived value of the elector providing the appraisal in identifying the manipulated object. The appraisals may be combined to generate a combined appraisal or score that may provide a baseline for comparison when objects are identified during script replay.

In an exemplary implementation, the adaptive object description techniques described herein may be used to enhance the robustness of the appraisal provided by the electors. For instance, the information that is collected by the electors may be used by the electors only to the extent that the information is important in identification of the object (as indicated by the importance scores generated by the adaptive identification module 122). Thus, the electors may not collect information that has been deemed unimportant (e.g., attributes that have been identified as dynamic), may discount information that has been deemed less important, or may focus only on that information that has been rated most important. In this manner, the appraisals generated by the electors can lead to greater accuracy in identifying objects 110 during script replay.

In accordance with the electors identification technique, at replay time, the script recorder/player module 124 can replay the previously recorded script 106 to replicate the record time operations performed on the document 114. When the script 106 calls for an object 110 to be acted on, the set of electors selected at record time to identify the object 110 are invoked. At least some of the invoked electors nominate objects 110 to serve as candidates for the object 110 acted on at record time. The invoked electors provide appraisals for each candidate object 110, which were generated based on the importance scores provided by the identification module 122. The appraisals of each candidate object 110 are weighted and combined (e.g., added) to form an appraisal score that determines a candidate's likelihood of being the object 110 acted on at record time.

In some embodiments, object identification during replay may involve some degree of ambiguity. In general, the electors technique handles ambiguity by selecting the candidate object 110 with the highest appraisal score as being the object 110 acted on at record time. If the selected candidate results in a match, the script recorder/player module 124 acts on the object 110 in accordance with the script 106.

During replay, the adaptive description technique can use the results of the matching to further adapt the object descriptions 108. For instance, if some ambiguity existed at replay time and the object match was successful, then the object description 108 may be adjusted so that importance scores corresponding to the attributes that contributed to the match are increased and/or the importance scores corresponding to attributes that did not contribute to the match are decreased. As another example, if a total match results, then the object description 108 may be adjusted so that the importance scores indicate that no further sampling is required. Yet further, if a match cannot be made, then some or all of the attributes in the object description 108 may be discounted or discarded altogether. Still further, if multiple objects 110 can be matched to the description 108, then the user may be presented with the matching objects 110 via the display device 106 and notified of the situation. The user may then select the correct object 110 and this selection may then be used to adjust the object description 108 associated with the selected object 110.

The electors-based identification technique discussed above has been provided only as an example to illustrate the manner in which adaptive object identification can enhance the effectiveness of object identification. It should be understood that the adaptive object identification techniques described herein can be used with and can enhance the effectiveness of other object identification mechanisms that may be implemented in system 100 or any other system in which object identification may be desirable.

In other implementations, system 102 may be connected to additional systems, such as a system 113 via the network 104. For instance, system 102 can be a client device at which users can make various selections or command actions that are captured by the script record/replay module 124 of the client device during a recording session. The script 106 and object descriptions 108 generated by the modules 122 and 124 can then be sent to a different system, such as the system 113, for execution (as represented by arrow 115). For example, the system 113 may be a test system designed to perform testing of a system-under-test using the script 106. In such implementations, the system 113 may also include an adaptive identification module 122 that may be executed by a processor(s) 117 of the system 113 so that the object descriptions 108 can be further adapted with information that is gathered during replay time.

In alternative implementations, the system 102 is a server system that is connected to multiple client devices. User actions made at the client devices can be captured by the script recorder/replay module 122 in the server system 102, and object descriptions 108 may be created by the adaptive identification module 122 in the system 102. In such implementations, the script 106 and descriptions 108 do not have to be communicated to a different system for execution, but may be executed on the system 102 itself.

Figure 2:
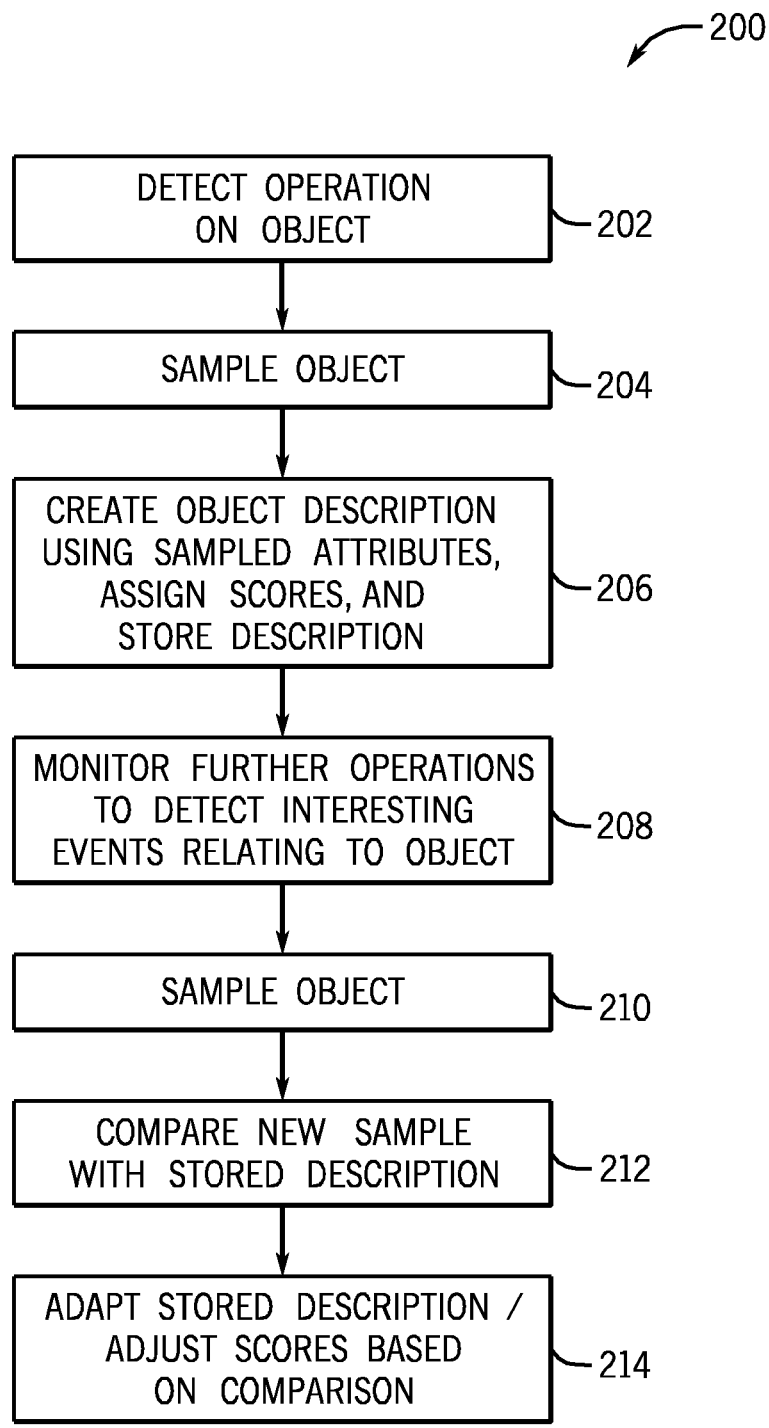
FIG. 2 is a flow diagram of an exemplary adaptive object identification technique that may be implemented in the system of FIG. 1, in accordance with various embodiments.

An exemplary embodiment of an adaptive object identification technique 200 that may be implemented in the arrangement 100 is shown in FIG. 2. At block 202, an operation on an object 110 is detected. At block 204, in response to detection of the operation, the object 110 is sampled. Based on this sampling, an object description 108 corresponding to the manipulated object 110 can be created and stored (block 206). In exemplary implementations, description 108 creation includes generating importance scores for each attribute of the object 110 that is included in the description 108. In some embodiments, the importance scores for the description 108 that is initially created may be set to a default value.

Monitoring of operations/interactions with the object 110 continues. When an interesting event relating to the object 110 (e.g., an operation on the object 110) is detected (block 208), then another sample is taken of the attributes associated with the object (block 210). The newly acquired information is compared with the stored object description 108 (block 212). If the comparison reveals that the values of any of the attributes of the object 110 have changed, then the description 108 for the object 110 is adjusted to compensate for those changes (block 214). Adjustment of the description can include adjusting the importance scores associated with the attributes. For instance, the score for an attribute that did not change may be raised, while the score for an attribute that did change may be lowered or set to a value that indicates that the attribute should be disregarded for purposes of object 110 identification.

Monitoring of operations and adjustment of the object description 108 can continue indefinitely, until script record time ends (and then may continue during script replay time), or until the importance scores indicate that the object description 108 can reliably be used to identify/locate the object 110 at a later time (e.g., the importance score exceeds a threshold value).

It should be understood that the flow diagram of FIG. 2 has been provided as an illustrative example only and that the adaptive identification technique may include fewer, additional, and/or different steps than those shown in FIG. 2. For instance, in some embodiments, an initial description 108 for an object 110 may be created and stored before script record time. In such embodiments, the adaptive description technique 200 may proceed directly to block 208 where it monitors operations on objects until an interesting event is detected that triggers a sampling of the object 110. In yet other embodiments, at least some of the steps shown in FIG. 2 can be performed in different orders and/or in parallel and that the various steps may be performed at record time, replay time, or during both record and replay times.

Instructions of software described above (including the technique of FIG. 2 and the instructions included in the modules 122 and 124 of FIG. 1) are loaded for execution on a processor (such as one or multiple processors 117, 118 in FIG. 1). A processor can include a microprocessor, microcontroller, processor module or subsystem, programmable integrated circuit, programmable gate array, or another control or computing device. As used here, a "processor" can refer to a single component or to plural components (e.g., one CPU or multiple CPUs).

Data and instructions are stored in respective storage devices (such as, but not limited to, storage media 120 in FIG. 1) which are implemented as one or more non-transitory computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method, comprising:
   providing an object description of an object of an application executed by a processor, wherein the object description is based on attributes associated with the object;
   detecting, by the processor, an operation on the object;
   comparing, by the processor, attributes of the object at the time of the detected operation with the object description to assess whether an attribute has changed; and
   adapting, by the processor, the object description based on the assessment, wherein the object description includes importance scores corresponding to the attributes, wherein each importance score indicates a relative importance of the corresponding attribute toward identifying the object at a later time, and wherein adapting the object description comprises adjusting the importance score corresponding to a given one of the attributes of the object by adjusting the importance score in a first manner in response to the given attribute having changed, and adjusting the importance score in a second manner in response to the given attribute not having changed, wherein adjusting the importance score in the first manner comprises one of lowering or raising the importance score, and adjusting the importance score in the second manner comprises another one of lowering or raising the importance score.

2. The method as recited in claim 1, wherein the importance score corresponding to the given attribute is lowered in response to the given attribute having changed.

3. The method as recited in claim 1, wherein the importance score corresponding to the given attribute is raised in response to the given attribute not having changed.

4. The method as recited in claim 1, wherein adapting the object description further comprises discarding the given attribute from the object description in response to the importance score corresponding to the given attribute falling below a predetermined threshold.

5. The method as recited in claim 1, further comprising:
   detecting a subsequent operation on the object;
   sampling attributes of the object at the time of the subsequent operation; and
   adjusting the adapted object description based on the sampled attributes.

6. The method as recited in claim 5, wherein the subsequent operation comprises a successful identification of the object at a later time, wherein the successful identification is based on the adapted object description.

7. The method as recited in claim 1, wherein the detected operation is one of a user action performed on the object, a change in a displayed attribute of the object, and a user action performed on a related object.

8. An adaptive object identification system, comprising:
   a memory;
   an object description corresponding to an object of an application, the object description stored in the memory, wherein the object description includes a plurality of attributes associated with the object and importance scores corresponding to the attributes, wherein each importance score is indicative of a relative importance of the corresponding attribute to identifying the object at a later time; and
   a processor to execute an adaptive identification module to detect operations on the object and to sample the object upon occurrence of an operation on the object, wherein the adaptive identification module adapts the stored object description based on a comparison of the sampled object with the stored object description, the adapting of the stored object description including changing the importance score corresponding to a given one of the attributes by changing the importance score in a first manner in response to the given attribute having changed, and changing the importance score in a second manner in response to the given attribute not having changed, wherein changing the importance score in the first manner comprises one of lowering or raising the importance score, and changing the importance score in the second manner comprises another one of lowering or raising the importance score.

9. The system as recited in claim 8, wherein the adaptive identification module adapts the stored object description based on differences between the sampled object and the stored object description.

10. The system as recited in claim 8, wherein the adaptive identification module adapts the stored object description based on similarities between the sampled object and the stored object description.

11. The system as recited in claim 8, wherein the importance score corresponding to the given attribute is lowered in response to the comparison revealing that the given attribute of the object has changed.

12. The system as recited in claim 8, wherein the importance score corresponding to the given attribute is raised in response to the comparison revealing that the given attribute of the object has not changed.

13. The system as recited in claim 8, wherein the adaptive identification module is executable to adapt the stored object description by discarding the given attribute in response to the importance score corresponding to the given attribute falling below a predetermined threshold.

14. The system as recited in claim 8, wherein the adaptive identification module is executable to employ the object description to identify the object during execution of the application at a later time, and wherein the adaptive identification module is executable to adapt the object description in response to the object being successfully identified at the later time.

15. An article comprising a non-transitory computer readable storage medium to store instructions that when executed by a computer cause the computer to:
   detect an operation on an object of an application, the object having a plurality of attributes;
   create an object description for the object based on the attributes of the object at the time of the detected operation;
   monitor the object to detect further operations on the object;
   sample the object in response to detection of a further operation;
   compare the sampled object with the object description to assess whether attributes of the object are dynamic or static; and
   adjust the object description based on the assessment of the attributes, wherein the object description includes importance scores corresponding to the attributes of the object, wherein each importance score indicates a relative importance of the corresponding attribute to identification of the object at a later time, and wherein adjusting the object description comprises adjusting the importance score for a given one of the attributes based on the assessment by decreasing the importance score corresponding to the given attribute in response to the given attribute having changed, and increasing the importance score corresponding to the given attribute in response to the given attribute not having changed.

16. The article as recited in claim 15, further comprising instructions that when executed by the computer cause the computer to adjust the object description such that the object description disregards attributes having corresponding importance scores less than a predetermined threshold.

17. The method of claim 1, further comprising:
   using the importance scores to distinguish between static attributes and dynamic attributes.

* * * * *